(No Model.)
E. REYNOLDS.
MEANS FOR CENTERING FACE PLATES FOR LATHES.
No. 522,122. Patented June 26, 1894.
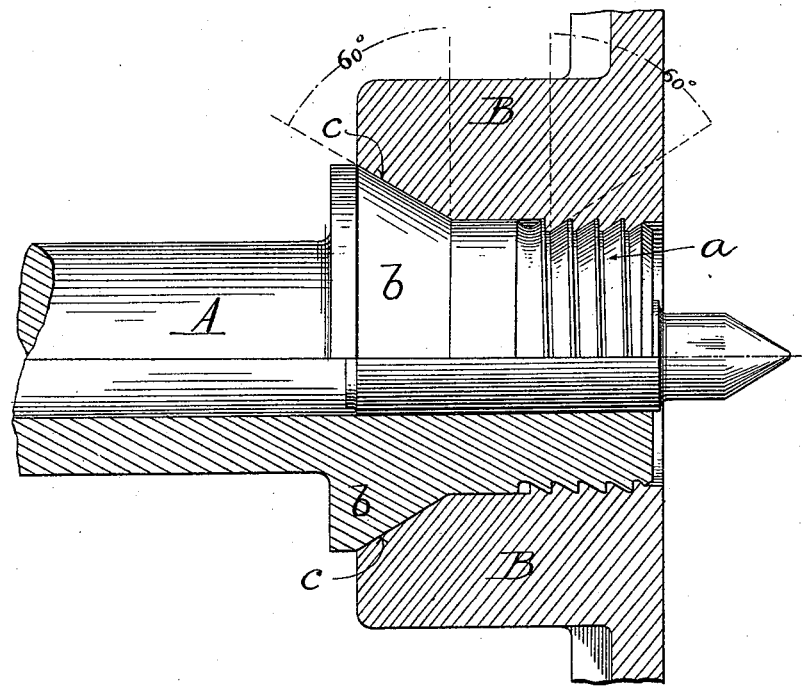
WITNESSES:
INVENTOR:
EDWIN REYNOLDS
BY
Dodge Sons,
ATTORNEYS.

UNITED STATES PATENT OFFICE.

EDWIN REYNOLDS, OF MILWAUKEE, WISCONSIN.

MEANS FOR CENTERING FACE-PLATES FOR LATHES.

SPECIFICATION forming part of Letters Patent No. 522,122, dated June 26, 1894.

Application filed December 29, 1893. Serial No. 495,119. (No model.)

*To all whom it may concern:*

Be it known that I, EDWIN REYNOLDS, a citizen of the United States, residing at Milwaukee, in the county of Milwaukee and State of Wisconsin, have invented certain new and useful Improvements in Means for Centering Face-Plates for Lathes, of which the following is a specification.

My invention relates to a novel means for securing face-plates, chucks, &c., to the spindles or arbors of machines, such, for instance, as lathes, drills, milling machines, &c., whereby a perfect centering of the plate or chuck is secured. The difficulty in the past has been that chucks and face plates when screwed upon the spindle or arbor, and trued up, and then removed and put back again, would not run perfectly true, thus occasioning delay and trouble, and, if the error be not discovered, resulting in spoiling or destroying the article being made. This has been due to the fact that the back of the hub of the plate or chuck has heretofore been screwed against a collar, the face of which has been made at right angles to the axis or center line of the arbor or spindle, there being, under such construction, no means of insuring a perfect centering of the plate or chuck. To overcome this difficulty I adopt the construction shown in the drawing, which is a vertical longitudinal central sectional view through a portion of the arbor or spindle and the face plate, the arbor being shown partly in section and partly in elevation.

A indicates the arbor or spindle having at its outer end the screw threads $a$, and behind or in rear of the threaded portion, a beveled or inclined collar $b$. The body B of the face-plate or chuck which is generally provided with a hub on its rear face as shown, is threaded to screw upon the threaded end of the arbor, and is further provided with a conical seat $c$ to accurately fit upon the collar $b$. It will be noticed that the angle of conical seat $c$ corresponds to the angle or inclination of one of the sides or side walls of the threads, but that the said inclined faces are reversed or arranged opposite to each other. From this construction it will be seen that frequent removal and replacing of the chuck or face plate will not affect or change the centering as the opposing angular faces insure an absolutely perfect centering at all times. I prefer to make these opposing faces on an angle of sixty degrees but this is not essential.

What I claim as my invention is—

In combination with the arbor A having the beveled thread $a$ and inclined or beveled collar $b$; the face-plate or chuck B provided with threads to fit those upon the arbor, and provided, also, with a conical seat $c$ to fit upon the beveled collar.

In witness whereof I hereunto set my hand in the presence of two witnesses.

EDWIN REYNOLDS.

Witnesses:
A. L. ROGERS,
B. T. LEUZARDER.